(12) United States Patent
Kettler et al.

(10) Patent No.: US 8,201,840 B2
(45) Date of Patent: *Jun. 19, 2012

(54) VEHICLE STEERING HEAD

(75) Inventors: Heinz Kettler, Ense-Parsit (DE);
Joachim Kettler, Werl (DE); Reinhard Rocholl, Werl (DE)

(73) Assignee: Kettler International, Inc., Virginia Beach, VA (US)

( * ) Notice: Subject to any disclaimer, the term of this patent is extended or adjusted under 35 U.S.C. 154(b) by 336 days.

This patent is subject to a terminal disclaimer.

(21) Appl. No.: 12/349,009

(22) Filed: Jan. 6, 2009

(65) Prior Publication Data

US 2009/0108558 A1   Apr. 30, 2009

Related U.S. Application Data

(63) Continuation of application No. 11/562,694, filed on Nov. 22, 2006, now Pat. No. 7,487,988, which is a continuation of application No. 10/671,668, filed on Sep. 29, 2003, now Pat. No. 7,156,408, which is a continuation of application No. 10/298,002, filed on Nov. 18, 2002, now Pat. No. 6,799,772, which is a continuation of application No. 10/092,516, filed on Mar. 8, 2002, now abandoned, which is a continuation of application No. 09/584,497, filed on Jun. 1, 2000, now Pat. No. 6,378,884.

(30) Foreign Application Priority Data

Jul. 5, 1999   (DE) .............................. 299 11 652 U

(51) Int. Cl.
*B62D 5/02* (2006.01)

(52) U.S. Cl. ........................................ 280/279; 280/272
(58) Field of Classification Search .................... 280/89, 280/271, 272, 279, 282; 403/83, 354; 74/495
See application file for complete search history.

(56) References Cited

U.S. PATENT DOCUMENTS

| | | | |
|---|---|---|---|
| 227,746 A | 5/1880 | Fancher |
| 446,181 A | 2/1891 | Brown |
| 565,718 A | 8/1896 | Boardman |

(Continued)

FOREIGN PATENT DOCUMENTS

CH   290478   8/1953

(Continued)

OTHER PUBLICATIONS

Document entitled "Italtrike, S.R.L's Preliminary Invalidity Contentions and Document Production" filed in a lawsuit initialed by Heinz Kettler GmbH and Co. KG against Italtrike and awarded Civil Action No. 1:09cv148-AJT-TCB.

(Continued)

*Primary Examiner* — Tony Winner
(74) *Attorney, Agent, or Firm* — Greenblum & Bernstein, P.L.C.

(57) ABSTRACT

A system for limiting a range of motion of a handlebar including a support tube adapted to be fixed to a frame, a member adapted to connect a wheel fork to the handlebar, an upper bearing support mounted to an upper end of the support tube, a plastic lower bearing support mounted to a lower end of the support tube, the member being rotatably mounted to the support tube via the upper and lower bearing supports, and a movement limiting system limiting a range of rotational movement of the member and utilizing stop surfaces arranged on the lower bearing support.

54 Claims, 9 Drawing Sheets

U.S. PATENT DOCUMENTS

| | | | |
|---|---|---|---|
| 576,566 A | 2/1897 | Foehl |
| 577,990 A | 3/1897 | Stegmann |
| 578,186 A | 3/1897 | Arnold |
| 579,664 A | 3/1897 | McConley |
| 582,279 A | 5/1897 | Gold |
| 585,590 A | 6/1897 | Pallen |
| 591,864 A | 10/1897 | Meyer |
| 642,269 A | 1/1900 | Smith |
| 940,783 A | 11/1909 | Buckland |
| 1,279,540 A | 9/1918 | Hams |
| 1,438,042 A | 12/1922 | Kincaid |
| 1,470,441 A | 10/1923 | Green |
| 1,500,480 A | 7/1924 | Zichman |
| 1,610,057 A | 12/1926 | Humphrey |
| 1,998,512 A | 4/1935 | Manton |
| 2,027,522 A | 1/1936 | Eck |
| 2,073,217 A | 3/1937 | Manton |
| 2,246,191 A | 6/1941 | Schmitz |
| 2,415,735 A | 2/1947 | Fastborg |
| 2,944,590 A * | 7/1960 | Cooper ................. 280/202 |
| 3,660,995 A | 5/1972 | Klein, Jr. |
| 3,785,676 A | 1/1974 | Klein, Jr. |
| 3,825,086 A | 7/1974 | Bombardier |
| 3,827,719 A | 8/1974 | Lohr et al. |
| 3,955,828 A | 5/1976 | Boudreau |
| 4,006,915 A | 2/1977 | Parker |
| 4,029,329 A | 6/1977 | Chambers |
| 4,079,957 A | 3/1978 | Blease |
| 4,120,514 A | 10/1978 | Sanders |
| 4,138,131 A | 2/1979 | Sommer |
| 4,261,588 A | 4/1981 | Kassai |
| 4,390,300 A | 6/1983 | Foster |
| D278,325 S | 4/1985 | Nagel |
| 4,608,729 A | 9/1986 | Huang |
| 4,624,470 A | 11/1986 | Love |
| 4,674,761 A | 6/1987 | Kassai |
| 4,714,261 A | 12/1987 | Kassai |
| 4,744,575 A | 5/1988 | Tonelli |
| 4,763,913 A | 8/1988 | Ehrlich |
| 4,887,827 A | 12/1989 | Heggie |
| 5,040,945 A * | 8/1991 | Levesque .................. 415/124.1 |
| 5,272,936 A | 12/1993 | Nagano |
| 5,279,181 A | 1/1994 | Boudreau |
| 5,291,797 A | 3/1994 | Chi |
| 5,295,553 A | 3/1994 | Morita et al. |
| 5,314,207 A | 5/1994 | Camfield et al. |
| D355,870 S | 2/1995 | Dieudonne |
| 5,501,478 A | 3/1996 | Doan |
| 5,505,493 A | 4/1996 | Camfield et al. |
| 5,573,262 A | 11/1996 | Chi |
| 5,826,935 A | 10/1998 | DeFreitas |
| 5,911,428 A | 6/1999 | Ueda et al. |
| 5,967,538 A | 10/1999 | Callaluca et al. |
| 6,003,890 A | 12/1999 | Inouye |
| 6,082,754 A | 7/2000 | Jeunet et al. |
| 6,170,841 B1 | 1/2001 | Mizuta |
| 6,186,524 B1 | 2/2001 | Mcqueeny |
| 6,378,884 B1 | 4/2002 | Kettler et al. |
| 6,799,772 B2 | 10/2004 | Kettler et al. |
| 7,156,408 B2 | 1/2007 | Kettler et al. |
| 7,487,988 B2 | 2/2009 | Kettler et al. |
| 2008/0296864 A1 | 12/2008 | Hutson |

FOREIGN PATENT DOCUMENTS

| | | |
|---|---|---|
| CH | 314538 | 7/1956 |
| CN | 2033378 | 3/1989 |
| CN | 2272402 | 1/1998 |
| CN | 2306938 | 2/1999 |
| DE | 892 722 | 10/1953 |
| DE | 32 42 863 | 11/1982 |
| DE | 39 14 050 | 4/1989 |
| DE | 298 22 875 | 12/1998 |
| DE | 299 01 449 | 7/1999 |
| DE | 299 11 652 | 7/1999 |
| DE | 199 62 468 | 12/1999 |
| FR | 2 614 002 | 4/1987 |
| FR | 2 755 419 | 5/1996 |
| GB | 145370 | 1/1920 |
| GB | 815456 | 11/1957 |
| GB | 2 042 910 | 3/1979 |
| GB | 2 129 319 | 11/1982 |
| GB | 2 145 382 | 3/1985 |
| GB | 2 190 635 | 11/1987 |
| GB | 2 283 217 | 3/1995 |
| WO | 95/05226 | 5/1995 |
| WO | 95/32118 | 11/1995 |

OTHER PUBLICATIONS

Hand made drawing p. No. RF12204 on ITALTRIKE letterhead. The drawing has a handwritten date of Jan. 21, 1987.

Hand made drawing p. No. RF12206 on ITALTRIKE letterhead. The drawing has a handwritten date of Jan. 21, 1987.

Black and while picture allegedly showing a mold having p. No. RF12208.

Black and white picture allegedly showing mold parts having p. No. RF12209.

Sheet table in Italian having a stamp entitled N. Citton & C, s.a.s.

Cover page of Europeo (in color) having p. RF12230 and dated Feb. 1, 1991.

Four sheets with p. Nos. RF12244-A, -B, -C and -D (in color) showing various pictures of trikes and a scooter on what appears to be notebook pages.

Four sheets with p. Nos. RF12245-A, -B, -C and -D (in color) showing various pictures of trikes and a bike on what appears to be notebook pages.

Pages 1 and 2 of a 1998 Radio Flyer catalog.

Three sheets labeled "Acknowledgment" which Radio Flyer alleges to be evidence that the Radio Flyer model No. 77 was sold during 1998.

A sheet entitled "Restricted Turning Prior Art" which Radio Flyer alleges to be evidence that the Radio Flyer model No. 77 was released Feb. 19, 1998.

A sheet entitled "Product Name: Roll N Ride" which Radio Flyer alleges to be evidence that the product shown in the photographs utilizes features recited in certain claims of US patent 6,799,772.

A sheet entitled "Product Name: Grow-With-Me-Trike" which Radio Flyer alleges to be evidence that the product shown in the photographs utilizes features recited in certain claims of US patent 6,799,772.

A sheet entitled "Product Name: Baby Too" which Radio Flyer alleges to be evidence that the product shown in the photographs utilizes features recited in certain claims of US patent 6,799,772.

A sheet entitled "Product Name: Tough Trikes" and "Product Name: Push'n Pedal Trike" which Radio Flyer alleges to be evidence that the products shown in the photographs utilizes features recited in certain claims of US patent 6,799,772.

Two sheets entitled "HBC Model 29875 CS 04G" which Radio Flyer alleges to be evidence that the product shown in the photographs utilizes features recited in certain claims of US patent 6,799,772.

Two sheets entitled "Smoby Pilot Alu Plus Juguetes Pico S.A." which Radio Flyer alleges to be evidence that the product shown in the photographs utilizes features recited in certain claims of US patent 6,799,772.

Two sheets entitled "Fisher Price Rock, Roll and Ride XL" which Radio Flyer alleges to be evidence that the product shown in the photographs utilizes features recited in certain claims of US patent 6,799,772.

Two sheets entitled "Charton Baby Driver 2 39150 St. Laurent France" which Radio Flyer alleges to be evidence that the product shown in the photographs utilizes features recited in certain claims of US patent 6,799,772.

Two sheets entitled "Processed Plastics West Coast Choppers" which Radio Flyer alleges to be evidence that the product shown in the photographs utilizes features recited in certain claims of US patent 6,799,772.

Two sheets entitled "Processed Plastic Item 17800-2" which Radio Flyer alleges to be evidence that the product shown in the photographs utilizes features recited in certain claims of US patent 6,799,772.

Two sheets entitled "Fischer Price Kawasaki (US Patent 6,651,528)" which Radio Flyer alleges to be evidence that the product shown in the photographs utilizes features recited in certain claims of US patent 6,799,772.
Two sheets entitled "Mattel Hot Wheels" which Radio Flyer alleges to be evidence that the product shown in the photographs utilizes features recited in certain claims of US patent 6,799,772.
Two sheets entitled "Tek-Net Toys Int'l Inc. USA 020821 Emergency 911" which Radio Flyer alleges to be evidence that the product shown in the photographs utilizes features recited in certain claims of US patent 6,799,772.
Two sheets entitled "Fischer Price L&S Ride on Harley" which Radio Flyer alleges to be evidence that the product shown in the photographs utilizes features recited in certain claims of US patent 6,799,772.
Two sheets entitled "Friendly Toys Item #7112 Fold-Up Trike" which Radio Flyer alleges to be evidence that the product shown in the photographs utilizes features recited in certain claims of US patent 6,799,772.
Document showing Radio Flyer model #77 entitled "Restricted Turning Prior Art" asserted by Radio Flyer to be prior art against grandparent US Patent No. 6,799,772 in Civil Action No. 204-CV-614. The papers filed in this litigation can be provided to the Examiner upon request. During litigation, Radio Flyer presented to Applicant two Radio Flyer model #77 trikes and asserted that these trikes were prior art. One trike had an adhesive label with the following text "P.D. 6/99" and another trike had an adhesive label with the text "P.D. 7/98". Applicant has no knowledge with regard to the meaning of "P.D.". Additionally, during litigation, Applicant ordered three Radio Flyer model #77 trikes on ebay from three different individuals. One trike had an adhesive label with the following text "P.D. 1/99", another trike had an adhesive label with the text "P.D. 7/99", and another trike had an adhesive label with the text "P.D. 10/99". Applicant has no knowledge with regard to whether or when any of these five trikes was sold or offered for sale in the U.S.
Italtrike "Kids on wheels" catalog (in color) pp. KET2818-KET2841 dated Jan. 2005.
Italtrike International "Kids on wheels" catalog (in color) pp. I00004-I00027 dated Jan. 2000.
Italtrike International catalog pp. I00028-I00039.
Radio Flyer catalog (in color) entitled "Specialty Collection 2000" pp. RF01266-RF01273.
Radio Flyer catalog (in color) entitled "Product Catalog 2000" pp. RF01274-RF01305.
Radio Flyer catalog (in color) entitled "Consumer Product Catalog" pp. RF01306-RF01313.
Radio Flyer catalog (in color) entitled "Product Catalog 1999" pp. RF01314-RF01349.
Radio Flyer catalog (in color) entitled "Specialty Collection Catalog 1999" pp. RF01350-RF01357.
Radio Flyer catalog (in color) pp. RF01358-RF01388.
Radio Flyer 1998 catalog (in color) pp. RF01389-RF01396.
English language translation of DE 299 01 449.
English Language Abstract of GB 815,456.
English Language Abstract of DE 32 42 863.
English Language Abstract of DE 39 14 050.
English Language Translation of Swiss No. 290478. The translation was provided by Radio Flyer in civil action 204-CV-614. Applicant makes no assertions with regard to the accuracy and completeness of this translation.
Six Catalog pages of company Processed Plastic Company showing a TimMee toy (1997).
Four pages of assembly Instructions for Push, Pedal & Ride Trike (date unknown).
Figs. 1, 2A and 2B purporting to show the Push, Pedal & Ride Trike in a fully assembled state and a partially disassembled state (date unknown).
Litigation documents entitled "Invalidity Contentions" with Exhibits A-G for Civil Action No. 10-2063 (FSH)(PS).
Litigation documents entitled "Supplemental Invalidity Contentions" with Exhibits A, H, I and J for Civil Action No. 10-2063 (FSH)(PS).
Litigation documents entitled "Joint Claim Construction and Prehearing Statement" for Civil Action No. 2:10-cv-2063-FSH-PS.
1996 Motorcycle Accessory Catalog (4 Pages).
1998 Motorcycle Accessories Custom Motorcycles (4 Pages).
Pages 20-31 of Litigation document entitled "Defendant Razor USA LLC's Objections and Responses to Plaintiffs' First Set of Interrogatories (Nos. 1-20)" for Civil Action No. I:10-CV-708.
Litigation document (35 pages) entitled "Defendant and Counterclaim Plaintiffs Kettler® International Inc.'s Opening Markman Submission" for Civil Action No. 2:10-cv-2063-FSH-PS.
Document (16 pages) with Exhibits A and B for Civil Action No. 2:10-cv-2063-FSH-PS.
Document (16 pages) with Exhibits 8-16 for Civil Action No. 2:10-cv-2063-FSH-PS.
Litigation document (26 pages) entitled "Kettler® International Inc.'s Responding Markman Brief Submission" for Civil Action No. 2:10-cv-2063-FSH-PS.
Litigation document (34 pages) entitled "Smart Trike USA, LLC's, Smart Trike Ltd's and Ofrat Baby Toys Manufacturers, LTD,'s Opening Markman Submission" for Civil Action No. 2:10-cv-2063-FSH-PS.
Document (13 pages) with Exhibit J for Civil Action No. 2:10-cv-2063-FSH-PS.
Litigation document (28 pages) entitled "Smart Trike USA, LLC's, Smart Trike Ltd's and Ofrat Baby Toys Manufacturers, Ltd,'s Responsive Markman Submission" for Civil Action No. 2:10-cv-2063-FSH-PS.
Document (2 pages) with Exhibit B for Civil Action No. 2:10-cv-2063-FSH-PS.
Document (11 pages) with Exhibit E for Civil Action No. 2:10-cv-2063-FSH-PS.
Document produced in Civil Action No. 2:10-cv-2063-FSH-PS and asserted by Ofrat to be 1998 Ofrat Baby Toys Manufacturers catalogue (OFRAT2000001-OFRAT2000024).
Document produced in Civil Action No. 2:10-cv-2063-FSH-PS and asserted by Ofrat to be a list of attendees of the 1994 Nurnberg Toy Fair (OFRAT2000025-OFRAT2000734).
Document produced in Civil Action No. 2:10-cv-2063-FSH-PS and asserted by Ofrat to be trike owner's manual (OFRAT2000735-OFRAT2000739).
Document produced in Civil Action No. 2:10-cv-2063-FSH-PS. And asserted by Ofrat to be German catalogue (OFRAT2000741-OFRAT2000748).
Document produced in Civil Action No. 2:10-cv-2063-FSH-PS and asserted by Ofrat to be a mold diagram or drawing (OFRAT2000749).
Litigation document with Exhibits A-YY entitled "Export Report of Michael D. Leshner, P.E. Pursuant to Fed. R. Civ. P. 26(a)(2)(B) . . . " for Civil Action No. 10-2063 (FSH) (PS). Not filed with the Court as of Nov. 30, 2011.
Document produced in Civil Action No. 2:10-cv-2063-FSH-PS and asserted by Ofrat to be a diagram or drawing (OFRAT2000750).
Document produced in Civil Action No. 2:10-cv-2063-FSH-PS and asserted by Ofrat to be a diagram or drawing (OFRAT2000751).
Document produced in Civil Action No. 2:10-cv-2063-FSH-PS and asserted by Ofrat to be a diagram or drawing (OFRAT2000752).
Document produced in Civil Action No. 2:10-cv-2063-FSH-PS and asserted by Ofrat to be a diagram or drawing (OFRAT2000753).
Document produced in Civil Action No. 2:10-cv-2063-FSH-PS and asserted by Ofrat to be a diskette (OFRAT2000754).
Document produced in Civil Action No. 2:10-cv-2063-FSH-PS and asserted by Ofrat to be a packaging pictures (OFRAT2000755-OFRAT2000759).
Document produced in Civil Action No. 2:10-cv-2063-FSH-PS and asserted by Ofrat to be a diskette (OFRAT2000760).
Document produced in Civil Action No. 2:10-cv-2063-FSH-PS and asserted by Ofrat to be a diskette (OFRAT2000761).
Document produced in Civil Action No. 2:10-cv-2063-FSH-PS and asserted by Ofrat to be a letter and invoice (OFRAT2000762-OFRAT2000763).
Document produced in Civil Action No. 2:10-cv-2063-FSH-PS and asserted by Ofrat to be invoices (OFRAT2000764-OFRAT2000767).

Document produced in Civil Action No. 2:10-cv-2063-FSH-PS and asserted by Ofrat to be letters and a handwritten note (OFRAT2000768-OFRAT2000770).
Document produced in Civil Action No. 2:10-cv-2063-FSH-PS and asserted by Ofrat to be letters and handwritten notes (OFRAT2000771-OFRAT2000774).
Document produced in Civil Action No. 2:10-cv-2063-FSH-PS and asserted by Ofrat to be a specification, letters and handwritten notes (OFRAT2000775-OFRAT2000778).
Document produced in Civil Action No. 2:10-cv-2063-FSH-PS and asserted by Ofrat to be a specification, letters and handwritten notes (OFRAT2000779-OFRAT2000783).
Document produced in Civil Action No. 2:10-cv-2063-FSH-PS and asserted by Ofrat to be a specification, letters and handwritten notes (OFRAT2000784-OFRAT2000788).
Document produced in Civil Action No. 2:10-cv-2063-FSH-PS and asserted by Ofrat to be a letter, handwritten note and page of an agreement (OFRAT2000789-OFRAT2000791).
Document produced in Civil Action No. 2:10-cv-2063-FSH-PS and asserted by Ofrat to be a letter, handwritten note and a specification (OFRAT2000792-OFRAT2000794).
Document produced in Civil Action No. 2:10-cv-2063-FSH-PS and asserted by Ofrat to be a letter (OFRAT2000795).
Document produced in Civil Action No. 2:10-cv-2063-FSH-PS and asserted by Ofrat to be letters, handwritten notes and a specification (OFRAT2000796-OFRAT2000800).
Document produced in Civil Action No. 2:10-cv-2063-FSH-PS and asserted by Ofrat to be a letter (OFRAT2000801-OFRAT2000803).
Document produced in Civil Action No. 2:10-cv-2063-FSH-PS and asserted by Ofrat to be a fedEx label (OFRAT2000804).
Document produced in Civil Action No. 2:10-cv-2063-FSH-PS and asserted by Ofrat to be a company logo and address (OFRAT2000805).
Document produced in Civil Action No. 2:10-cv-2063-FSH-PS and asserted by Ofrat to be FedEx forms (OFRAT2000806-OFRAT2000810).
Document produced in Civil Action No. 2:10-cv-2063-FSH-PS and asserted by Ofrat to be invoices (OFRAT2000811-OFRAT2000813).
Document produced in Civil Action No. 2:10-cv-2063-FSH-PS and asserted by Ofrat to be diskettes (OFRAT2000814-OFRAT2000815).
Document produced in Civil Action No. 2:10-cv-2063-FSH-PS and asserted by Ofrat to be a brochure (OFRAT2000816-OFRAT2000893).
Document produced in Civil Action No. 2:10-cv-2063-FSH-PS and asserted by Ofrat to be a picture of a child on a trike (OFRAT2000894).
Document produced in Civil Action No. 2:10-cv-2063-FSH-PS and asserted by Ofrat to be a picture of a trike (OFRAT2000895).
Document produced in Civil Action No. 2: 10-cv-2063-FSH-PS and asserted by Ofrat to be a brochure (OFRAT2000896-OFRAT2000931).
Document produced in Civil Action No. 2:10-cv-2063-FSH-PS and asserted by Ofrat to be a purchase order for Toddler Tracks trikes (OFRAT2000935-OFRAT2000937).
Document produced in during a litigation involving Kettler and appearing to show drawings identified as ITAL000012-ITAL000014.
Document produced in during a litigation involving Kettler and appearing to show export forms identified as ITAL000015-ITAL000020.
Document produced in during a litigation involving Kettler and appearing to show assembly instructions for an Italtrike Oko tricycle identified as ITAL000021-ITAL000032.
Document produced in during a litigation involving Kettler and appearing to show an Italtrike trike and manufacturing drawings associated therewith identified as ITAL000033-ITAL000041.
Document produced in during a litigation involving Kettler and appearing to show a catalog entitled "dollsandreams®." identified as ITAL000042-ITAL000140.
Document produced in during a litigation involving Kettler and appearing to show shipping/invoice type documents identified as ITAL000141-ITAL000176.
Document produced in during a litigation involving Kettler and appearing to show an Italtrike owner's manual identified as ITAL000186-ITAL000213.
Document produced in during a litigation involving Kettler and entitled "Italtrike limited turning system n. °3" identified as ITAL000214-ITAL000215.
Document produced in during a litigation involving Kettler and appearing to show pictures of various Italtrike trikes and parts thereof identified as ITAL000216-ITAL000221.
Document produced in during a litigation involving Kettler and entitled "Italtrike International Kids on wheels" dated 2002-2003 identified as ITAL000222-ITAL000229.
Document produced in during a litigation involving Kettler and entitled "Italtrike International "Kids on wheels"" dated 2003-2004 identified as ITAL000230-ITAL000245.
Document produced in during a litigation involving Kettler and entitled "ECMD Early Childhood Manufacturers' Direct Since 1996" identified as ITAL000246-ITAL000248.
Document produced in during a litigation involving Kettler and appearing to be an Article entitled "Made for Children, Fit for Parents" dated Sep. 22, 2002 identified as ITAL000250-ITAL000251.
Document produced in during a litigation involving Kettler and appearing to show shipping/invoice type documents identified as ITAL000252-ITAL000258.
Document produced in during a litigation involving Kettler and appearing to show pictures of various Italtrike trikes and parts thereof identified as ITAL000263-ITAL000278.
Document produced in during a litigation involving Kettler and appearing to show, among other things, pictures of various Italtrike trike parts and invoices identified as ITAL000292-ITAL000314.
Document produced in during a litigation involving Kettler and appearing to show a cover page with the title "Todson" followed by pages of invoices identified as ITAL000315-ITAL000318.
Document produced in during a litigation involving Kettler and appearing to show an advertisement for company Todson identified as ITAL000319.
Document produced in during a litigation involving Kettler and appearing to an Article entitled "Bicycle Retailer" identified as ITAL000320.
Document produced in during a litigation involving Kettler and appearing to show a catalog entitled "Pony" dated 2000-2001 identified as ITAL000321-ITAL000332.
Document produced in during a litigation involving Kettler and entitled "Italtrike limited turning system n. °2" identified as ITAL000334-ITAL000335.
Document produced in during a litigation involving Kettler and appearing to show a catalog for a oko trike identified as ITAL000336-ITAL000341.
Document produced in during a litigation involving Kettler and appearing to show, among other things, invoices identified as ITAL000342-ITAL000345.
Document produced in during a litigation involving Kettler and appearing to show technical drawings identified as ITAL000347-ITAL000349.
Document produced in during a litigation involving Kettler and entitled "Italtrike limited turning system n. °6" identified as ITAL000402-ITAL000408.
Document produced in during a litigation involving Kettler and appearing to show pictures of an Italtrike trike identified as ITAL000417.
Document produced in during a litigation involving Kettler and entitled "ECMD Early Childhood Manufacturers' Direct Since 1996" identified as ITAL000419-ITAL000422.
Document produced in during a litigation involving Kettler and appearing to show a technical drawing identified as ITAL000423.
Document produced in during a litigation involving Kettler and appearing to show invoices identified as ITAL000425-ITAL000428.

Document produced in during a litigation involving Kettler and appearing to show an alutrike owner's manual identified as ITAL000432-ITAL000459.

Document produced in during a litigation involving Kettler and appearing to show an alutrike brochure dated 2002-2003 identified as ITAL000460-ITAL000463.

Document produced in during a litigation involving Kettler and appearing to show an Italtrike catalog dated 2009/10 identified as ITAL000469-ITAL000496.

* cited by examiner

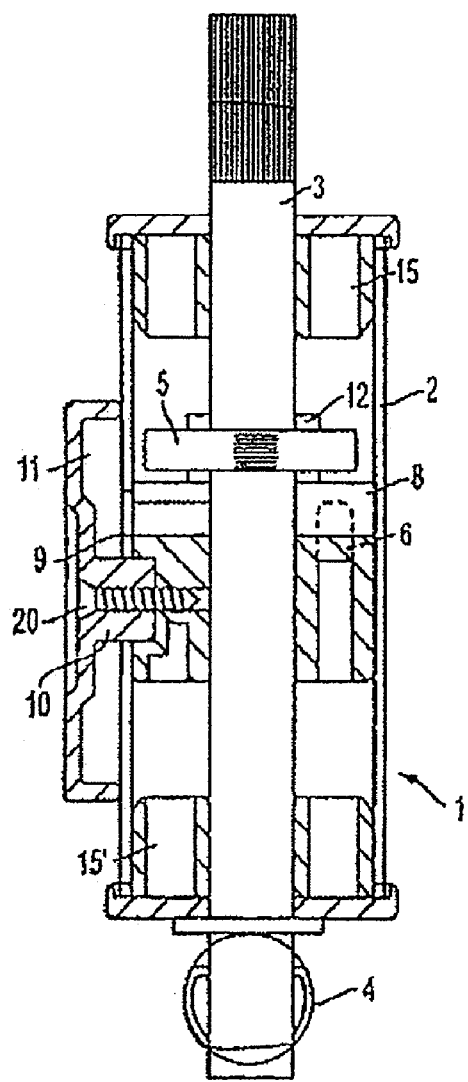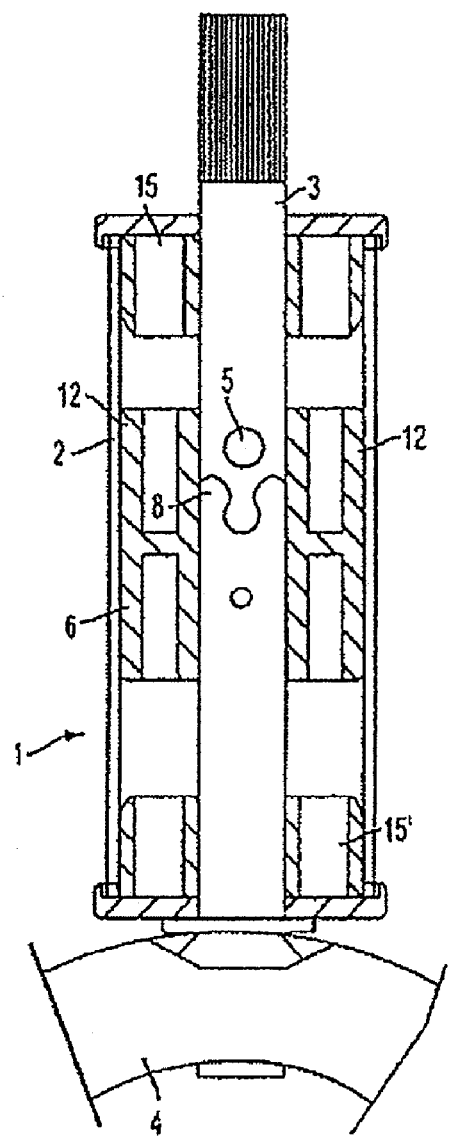
FIG. 2
FIG. 3

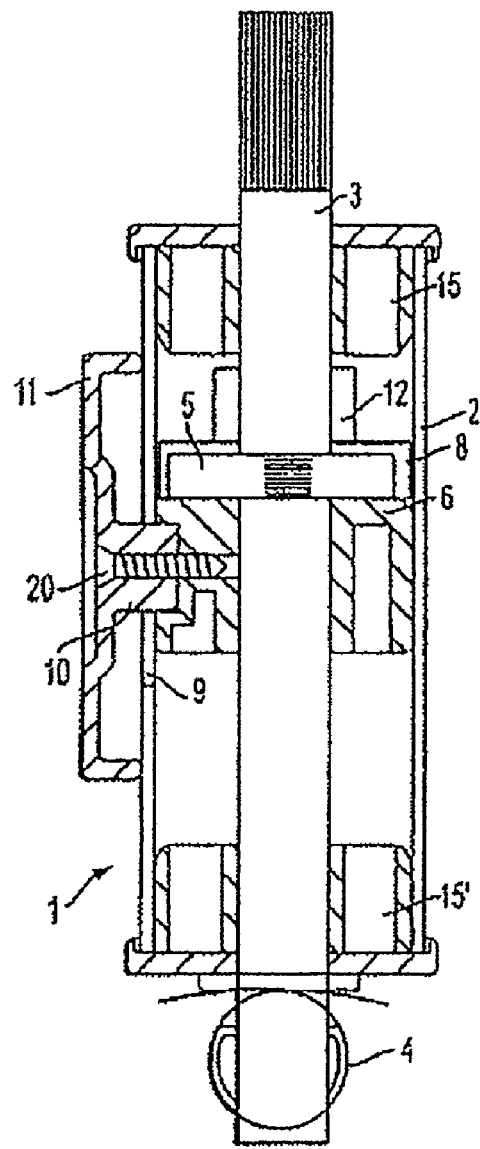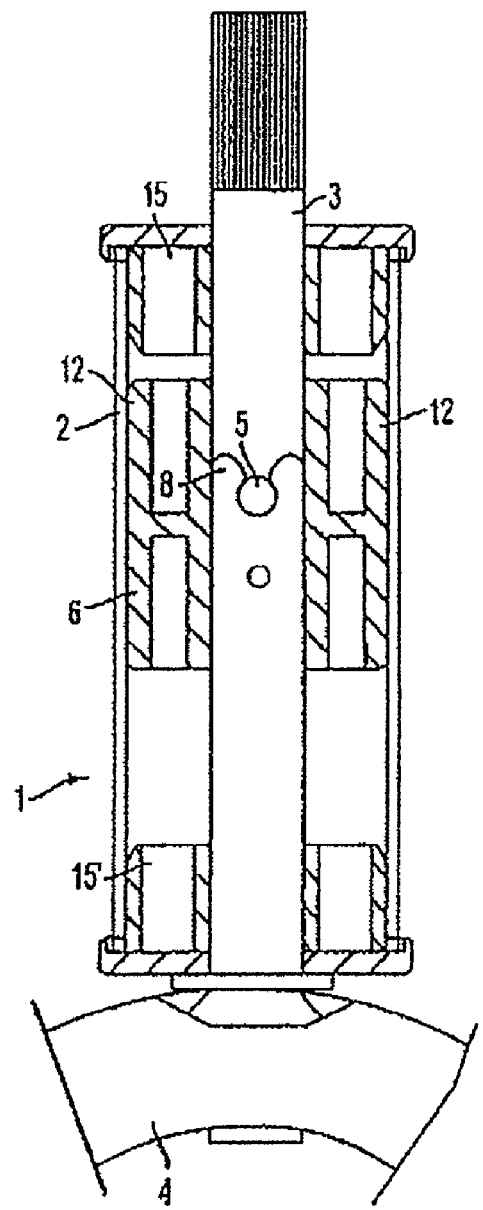
FIG. 4
FIG. 5

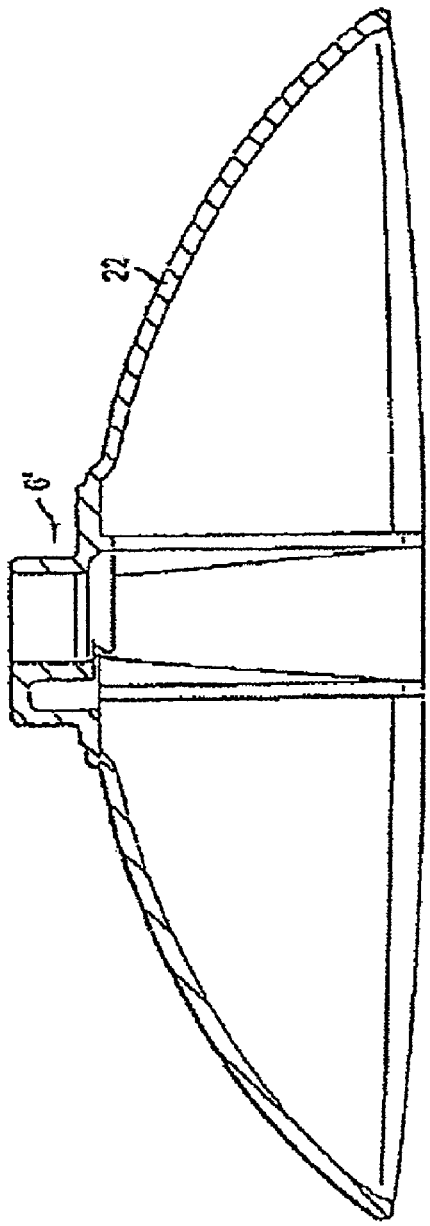
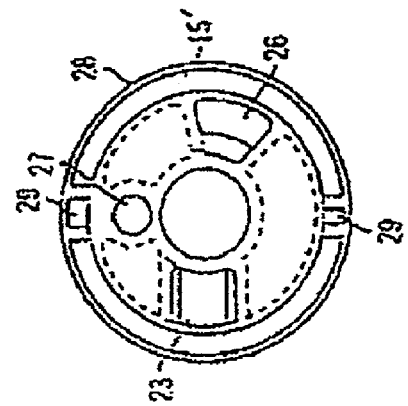
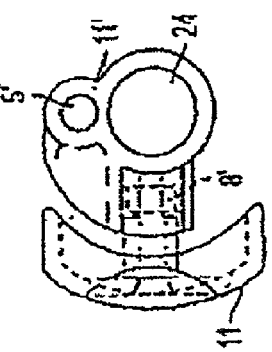
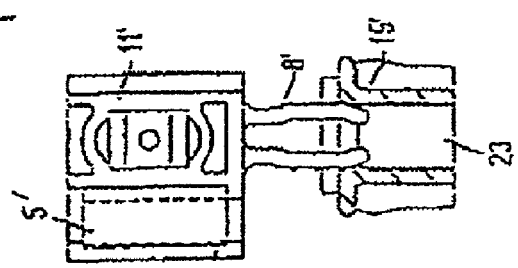
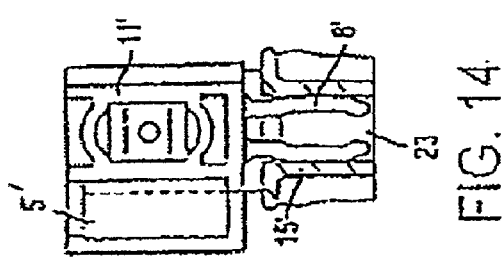

VEHICLE STEERING HEAD

CROSS-REFERENCE TO RELATED APPLICATIONS

The present application is a continuation of U.S. application Ser. No. 11/562,694 which was filed Nov. 22, 2006, which is a continuation of U.S. application Ser. No. 10/671,668 which was filed Sep. 29, 2003, which is a continuation of U.S. application Ser. No. 10/298,002, which was filed Nov. 18, 2002, now U.S. Pat. No. 6,799,772, which is a continuation of U.S. application Ser. No. 10/092,516 filed Mar. 8, 2002, now abandoned, which is a continuation of U.S. application Ser. No. 09/584,497 filed Jun. 1, 2000, now U.S. Pat. No. 6,378,884, the disclosures of which are expressly incorporated by reference herein in their entireties. Further, the present application claims priority under 35 U.S.C. §119 of German Patent Application No. 299 11 652.2, filed on Jul. 5, 1999, the disclosure of which is expressly incorporated by reference herein in its entirety.

BACKGROUND OF THE INVENTION

1. Field of the Invention

The present invention relates to a vehicle steering head and in particular, to a steering head for a vehicle comprising a support tube which has rotatably supported therein a fork member to which a wheel cover and a handlebar can be secured.

2. Discussion of Background Information

Vehicle steering heads of the above-described type are in particular used in bicycles or tricycles, and in particular in tricycles or bicycles for children.

In devices of the above-described type it is desirable for safety reasons that accidents be avoided which may be caused by an excessively large handlebar deflection. It has been found that when there is an excessively large handlebar deflection (e.g., the handle bar rotates beyond a point where effective steering occurs), the vehicle may tilt to the side. Moreover, such deflections or excessive rotation may run the risk that a user impacts his body against the handlebar. Additionally, the user may get caught with his/her feet in the front wheel and may be even be injured by the pedals.

A further drawback or disadvantage of prior-art devices occurs when they are pushed with a push rod type device. In such cases, these devices have a tendency towards uncontrolled steering movements of the front wheel which cannot be mastered or effectively controlled by small children, in particular.

SUMMARY OF THE INVENTION

The present invention therefore provides a vehicle steering head of the above-mentioned type which is of a simple construction and which can operate in an easy and reliable manner. Moreover, this design avoids the drawbacks of the prior art and can in particular limit a handlebar deflection to a desired degree. The invention also has provision for locking the handlebar.

According to one aspect of the invention a latch element is secured to a fork member on a portion provided inside the support tube. A linkage element is supported in the support tube for rotation therewith. The linkage element is displaceable or moveable in a longitudinal direction of the support tube. The linkage element comprises at least one stop surface which limits a rotation of the fork member and can be brought into contact with the latch element. Moreover, the linkage element comprises at least one locking element which is releasably connectable to the latch element.

According to another aspect of the invention a latch element is supported on the support tube. A linkage element is arranged on the fork member and connected to the tube for rotation therewith. The latch element is freely displaceable or moveable along the support tube. The linkage element comprises at least one stop surface which limits a rotation of the fork member and can be brought into contact with the support tube. Moreover, at least one latch element is provided that is releasably connectable to the support tube.

The vehicle steering head according to the invention is characterized by a number of considerable advantages.

First of all, it is possible to install or utilize the steering head in a frame of any desired design, e.g. children's bicycles or tricycles. Ideally, the dimensions of the steering head are such that they do not interfere with the remaining structure of the frame within which it is installed. Of course, the steering head may be combined with any and all common types of frames where ever its advantageous design is desired. Accordingly, the steering head may be utilized in a variety of devices where limited deflection or rotation and/or locking are desired.

Because the invention utilizes a latch element which is arranged in the support tube, no functional parts of the steering head need be outwardly visible or accessible. Accordingly, the internal parts are less susceptible to damage. Additionally, this design is less likely to cause injury when used by children or infants.

As a result of utilizing a linkage element according to the invention, it is possible to reliably lock the fork member and thus the wheel fork and the front wheel. Such a locking provision is easily be accomplished by displacing or moving the linkage element. This design ensures a high degree of operational safety and operational reliability.

The linkage element preferably utilizes stop surfaces which cooperate with the latch element in a manner where they are brought into contact with one another. In this way, the steering angle can be limited to a particularly or desired range. This limited range of motion of the steering angle can be realized according to the invention in different ways. The invention contemplates that the available steering angle is freely selectable within a wide desired range. This is of particular advantage to vehicles for children such as tricycles, which may require a steering angle of approximately 45° to each side. Of course, other desirable steering angles can be utilized. However, by designing in the desired limited steering angle, lateral tilting of the tricycle or similar devices can be prevented or their risk significantly reduced. Additionally, the risk of injuries which may be caused by the pedals, e.g., devices which utilize pedals on the front wheel can be reduced. Finally, the risk of injury which can occur when the handlebar exceeds a controlled steering angle can be ruled out to a considerable extent.

The invention also provides for a linkage element having a locking element which is releasably connectable to the latch element. This design ensures that when a push rod is used for pushing the device, i.e., a tricycle, the front wheel thereof may be reliably locked in place during straight travel.

In an advantageous embodiment of the invention, the latch element is designed in the form of a pin which extends in a direction transverse to the fork member. The pin may extend through the fork member such that it projects at both sides of the fork member. Alternatively, the pin can project from the fork member on only one side. Moreover, the pin can be firmly connected to the fork member, e.g. by welding or other conventional attachment techniques. Additionally, it may be secured by press fitting with or without utilizing a knurled portion. Of course, the dimensions of the pin can easily be adapted to the respective conditions of use.

It should be noted that the manufacturing costs of the steering head are reduced by the above-described construction to quite a considerable degree.

In another advantageous embodiment of the invention, the linkage element is substantially designed in the form of a hollow cylinder. Thus, the linkage element can be reliably guided in the support tube and surround the fork member. Additionally, the linkage element can be designed as a single integral part or several parts which are either joined together or which cooperate together.

It is advantageous for the longitudinal displacement or movement of the linkage element to be along an axis of the support tube and the fork member. Accordingly, the support tube may comprise at least one longitudinal slot or a similar recess through which a connection element extends which is connected to the linkage element. This design also utilizes a slide which is arranged outside the support tube.

The slide facilitates the ease of handling or movement of the linkage element. In such a design, a displacement of the slide, which may additionally be provided with locking mechanism or fixing safety mechanism, effects a corresponding displacement or movement of the linkage element. The locking mechanism or fixing mechanism allows for fixing the front wheel in a single or set travel position which is preferably straight. Moreover, the invention also contemplates that the linkage element may be provided with inclined inlet surfaces or intercepting mechanisms which engage the latch element so as to initiate a locking action when the front wheel is slightly deflected angularly.

Stop surfaces on the latch element are preferably formed on at least one front attachment of the linkage element. Additionally, it is particularly advantageous when two opposite attachments or stops are in symmetry with each other and are each provided with at least one stop surface located on the linkage element. Thus, by utilizing two attachments or stops which are in symmetry with each other, this design can limit the steering angle in a symmetrical fashion to both the left and the right side.

In another advantageous embodiment of the invention, the associated stop surfaces of the attachments or stops act to limit the rotation of the fork member to a predetermined angular range at both sides. This angular range may e.g. be approximately 45° to both sides, for a total range of motion of approximately 90°.

The locking element is preferably designed in the form of at least one front recess which receives the latch element. Such an advantageous design makes it possible to grip and fix the latch element upon displacement or movement of the linkage element. Additionally, it is advantageous that the recess be retracted or set back relative to the front attachment, so that the attachments or stops can always remain in the plane of the latch element, while upon a displacement of the latch element, it is only the recess which can additionally be brought into engagement.

To implement a simple and operationally reliable structure of the steering head, it may be advantageous for the recess to be centrally arranged between the two attachments or stops.

The invention also contemplates that the fork member itself has not been changed constructionally. In other words, the invention can be adapted to work with a conventional fork member. Also, the invention makes it possible to manufacture all functional parts separately in a very simple manner. As a result, advantageous production costs can be achieved.

In a preferred design of a previously described embodiment, the linkage element is designed as part of a mudguard which extends from below into the support tube. This design allows for significant cost savings since the mudguard is normally made from plastics and is typically already included in most vehicles of the above-described type. The linkage element can thus be mounted on the mudguard or made integrally therewith, in a particularly easy way and at low costs.

A further advantage of the this embodiment is that the latch element can be designed in the form of a bolt which arranged to be parallel with the fork member. The latch element of this design can thus be given relatively large dimensions so that the diameter of the support tube itself need not be chosen with such a large size.

It may be of particular advantage when the latch element is connected to a slide which extends into the support tube so as to be able to design the lock of the front wheel in a particularly simple manner. Furthermore, the locking element may preferably be connected to the slide. Moreover, the locking element serves to reliably maintain the locked state and to prevent any unintended unlocking. The locking element also preferably engages into a recess of a bearing which supports the fork member in the support tube. As a result, it is not necessary to mount additional parts or to take installation measures on the support tube itself.

It may also be of particular advantage for the limitation of the steering angle to be accomplished by a lower bearing which supports the fork member in the support tube. This lower bearing may have formed thereon an attachment which projects in the direction of the linkage element and which can be brought into contact with the stop surfaces formed on the linkage element and thus on the mudguard. This design has the advantageous effect that the predetermined angular range can be limited at both sides as well, e.g. approximately 45° each side.

The invention provides a vehicle steering head including a support tube which rotatably supports therein a fork member to which a wheel fork and a handlebar can be secured, the steering head including a latch element projecting from the fork member and disposed within the support tube, and a linkage element disposed within the support tube, wherein the linkage element is moveable in a direction which is substantially parallel to an axis of the fork member and comprises at least one stop surface for limiting a rotation of the fork member when the latch element contacts the at least one stop surface. The linkage element may further comprise at least one locking element for locking the fork member in a single position. The at least one locking element may releasably engage the latch element when the fork member is locked. The latch element may comprise a pin. The pin may project substantially perpendicular to the axis of the fork member. The linkage element may comprise a substantially cylindrical shape. The linkage element may comprise a plurality of hollow chambers separated by connecting walls. The support tube may comprise an opening which allows a connecting element to pass therethrough. The opening may comprise a longitudinal slot. The connecting element may be secured to the linkage element. The movement of the linkage element may be limited by the movement of the connecting element within the longitudinal slot. The steering head may further comprise a slide which is secured to the connecting element, the slide being disposed adjacent an outer surface of the support tube. The at least one stop surface may be disposed on at least one stop.

The at least one stop may comprise a projection which extends from the linkage element. The at least one stop may comprise a wedge-shaped hollow projection having two angled lateral stop surfaces. The at least one stop may comprise two stops which are disposed opposite one another. Each stop may comprise a wedge-shaped hollow projection having two angled lateral stop surfaces. The two stops may define a limited range of rotational motion of the fork member in each of a clockwise and a counter-clockwise direction. The limited range of motion in the clockwise direction may be substantially equal to the range of motion in the counter-clockwise direction. The limited range of motion in one of the clockwise and counter-clockwise direction may be approximately 45 degrees.

The linkage element may further comprise at least one locking element, the at least one locking element comprising at least one recess which is adapted to receive the latch element. The at least one recess is set back some distance from a surface of at least one stop. The at least one recess is centrally disposed between at least two stops.

The steering head may further comprise an upper bearing disposed on one end of the support tube and a lower bearing disposed on another end of the support tube, each of the upper and lower bearings having an opening which allows the fork member to pass therethrough.

The steering head may be disposed on a tricycle frame.

The invention also provides for a vehicle steering head including a support tube which rotatably supports therein a fork member to which a wheel fork and a handlebar can be secured, the steering head including a latch element disposed within the support tube, the latch element being moveable in a direction which is substantially parallel to an axis of the fork member, and a linkage element connected to the fork member so as to rotate therewith, the linkage element comprising at least one stop surface, wherein the at least one stop surface limits the rotation of the fork member with respect to the support tube. The steering head may further comprise a slide, wherein the slide is disposed within the support tube and retains the latch element. The slide may further comprise at least one locking element for releasably securing the slide to the support tube. The linkage element may comprise a mudguard. The mudguard may be disposed between one end of the support tube and a wheel fork. The latch element may comprise a rod like member which is arranged substantially parallel to the axis of the fork member. The rod like member may comprise one of a bolt and a pin. The latch element may be connected to a slide, the slide being disposed within the support tube. The slide may be moveable substantially parallel to the axis of the fork member. A locking element may be connected to the slide.

The steering head may further comprise a bearing support disposed on at least one end of the support tube. The bearing support may be disposed on a lower end of the support tube. The steering head may further comprise a locking element disposed within the support tube, the locking element being insertable into a recess of the bearing support. The bearing support may comprise at least one stop, the at least one stop comprising at least one surface which engages the linkage element. The at least one stop may comprise a projection which engages a recess in the linkage element. The projection and the recess may cooperate to limit the rotational movement of the fork member within a desired range. The range of the rotational movement may be limited by at least two stop surfaces. The at least two stop surfaces may define a limited range of rotation in one of a clockwise and a counter-clockwise direction. The at least two stop surfaces may define a limited range of rotation in each of a clockwise and a counter-clockwise direction. The limited range of rotation between the at least two stops may be approximately 45 degrees.

The steering head may be disposed on a tricycle frame.

The invention further provides for a vehicle steering head including a support tube and fork member which is rotatably mounted with respect to the support tube, the steering head including an upper bearing support disposed at an upper end of the support tube and a lower bearing support disposed at a lower end of the support tube. The fork member comprises a fork end, a handlebar, and a latch element projecting from the fork member between the fork end and the handlebar end. The latch element is disposed within the support tube and a linkage element is slidably disposed within the support tube. The linkage element comprises at least one stop surface for engaging the latch element, wherein the linkage element is moveable in a direction which is substantially parallel to an axis of the fork member from a first position where the latch element and the at least one stop cooperate to limit the rotational movement of the fork member to a second position where the latch element releasably engages a locking element disposed on the linkage element whereby the fork member is prevented from rotating in any direction. The linkage element may be moveable from outside the support tube via a slide. The slide may be connected to the linkage element via a connection element, the connection element passing through a longitudinal in the support tube. The longitudinal slot may limit the movement of the linkage element.

The invention also relates to a vehicle steering head including a support tube and fork member which is rotatably mounted with respect to the support tube, the steering head including an upper bearing support disposed at an upper end of the support tube and a lower bearing support disposed at a lower end of the support tube. The lower bearing support comprises at least one stop surface, the fork member comprising a fork end, a handlebar, and a latch element which is slidably disposed adjacent the fork member between the fork end and the handlebar end, the latch element being disposed within the support tube and a linkage element moveably disposed adjacent the lower support bearing. The linkage element comprises at least one stop surface for engaging the at least one stop surface of the lower bearing support and comprising a recess for receiving the latch element, wherein the linkage element is moveable in a direction which is substantially parallel to an axis of the fork member from a first position where the latch element engages only the lower bearing support and where the at least one stop of the lower bearing support cooperates with the at least one stop of the linkage element to limit the rotational movement of the fork member to a second position where the latch element releasably engages a recess in the linkage element whereby the fork member is prevented from rotating in any direction. The linkage element may be moveable from outside the support tube via a slide. The slide may be connected to the linkage element via a connection element, the connection element passing through a longitudinal in the support tube. The longitudinal slot may limit the movement of the linkage element. The linkage element may further comprise at least one locking element for engaging a locking recess in the lower bearing support. The at least one locking element engages the locking recess of the lower bearing support when the latch element engages the recess in the linkage element.

The invention provides for a vehicle steering head including a fork member adapted to engage a handlebar, a support tube which rotatably supports the fork member, a latch element disposed within the support tube, and a slide which is moveable with respect to the support tube, wherein the slide is moveable from at least one position wherein linkage element prevents the fork member from rotating with respect to the support tube to at least another position wherein the linkage element allows the fork member to rotate with respect to the support tube in at least two directions. The latch element may comprise a rod-like member.

The invention also provides for a vehicle steering head that includes a support tube adapted to be coupled to a vehicle frame, an upper bearing support arranged at an upper end of the support tube, a lower bearing support arranged at a lower end of the support tube, the lower bearing support comprising at least one stop surface, a cylindrical element rotatably mounted to the support tube via the upper and lower bearing supports, the cylindrical element having one end that is adapted to be connected to a wheel fork and another end that is adapted to be connected to a handlebar, a latch element movably disposed within the support tube, a slide coupled to the latch element, the latch element being movable from outside the support tube, a linkage element that is rotatable with respect to the support tube, and the linkage element cooperating with the lower bearing support to limit a rotational movement of the linkage element with respect to the support tube, wherein the latch element and the linkage element are releasably engagable with each other to prevent rotational movement of the cylindrical element.

The invention also provides for a vehicle steering head comprising a support tube adapted to be fixed to a frame, a fork member adapted to connect a wheel fork to a handlebar, the fork member being rotatable with respect to the support tube, a mechanism which limits the rotational movement of the fork member in each of two directions, and a lower bearing support mounted to the support tube, wherein the mechanism and the lower bearing support cooperate to limit the rotational movement of the fork member.

The lower bearing support may be non-rotatably fixed to the support tube. The lower bearing support may comprise at least one stop surface. The lower bearing support may comprise two stop surfaces. The mechanism may comprise at least one stop surface. The mechanism may comprise two stop surfaces. The mechanism may comprise a linkage element having at least one stop surface. The linkage element may rotate with the fork member. The linkage element may be arranged on a mudguard. The fork member may be cylindrically shaped. The steering head may further comprise a handlebar connected to one end of the fork member and a wheel fork connected to another end of the fork member.

The invention also provides a vehicle steering head comprising a support tube adapted to be fixed to a frame, a cylindrical member adapted to connect a wheel fork to a handlebar, the cylindrical member being rotatable with respect to the support tube, a linkage element being movable and comprising at least two stop surfaces, wherein one of the at least two stop surfaces limits the rotation of the cylindrical member in one direction, and wherein another of the at least two stop surfaces limits the rotation of the cylindrical member in another direction.

The linkage element may rotate with the cylindrical member. The linkage element may rotate with a mudguard.

The invention also provides for a vehicle steering head comprising a support tube adapted to be fixed to a frame, a connecting element adapted to connect a wheel fork to a handlebar, the connecting element being rotatable with respect to the support tube, a linkage element being rotatable and comprising at least two stop surfaces, a mudguard that rotates with the linkage element, one of the at least two stop surfaces limiting the rotation of the connecting element in one direction, and another of the at least two stop surfaces limiting the rotation of the connecting element in another direction.

The invention also provides for a vehicle steering head comprising a support tube adapted to be fixed to a frame, a fork member adapted to connect a wheel fork to a handlebar, the fork member being rotatable with respect to the support tube, and a system which limits the rotational movement of the fork member in each of two directions, wherein the system includes one part which is non-rotatably mounted to the support tube and another part which rotates with the fork member.

BRIEF DESCRIPTION OF THE DRAWINGS

The present invention is further described in the detailed description which follows, in reference to the noted plurality of drawings by way of non-limiting examples of embodiments of the present invention, in which like reference numerals represent similar parts throughout the several views of the drawings, and wherein:

FIG. 2 is a simplified sectional side view of the steering head according to the invention in an unlocked state;

FIG. 3 is a side view, turned or oriented by 90° (a right angle) of the arrangement shown in FIG. 2;

FIG. 4 is a sectional side view similar to FIG. 2, in the locked state;

FIG. 5 is a side view, similar to FIG. 3, of the view according to FIG. 4;

FIG. 13 is a sectional view of the arrangement according to FIG. 12 along the sectional lines XIII-XIII of FIG. 12;

FIG. 14 is an enlarged side view showing a portion of the slide and of the locking element in the locked state;

FIG. 15 is a view analogous to FIG. 14, in the unlocked state;

FIG. 16 is a top view on the slide; and

FIG. 17 is a top view on the lower bearing.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
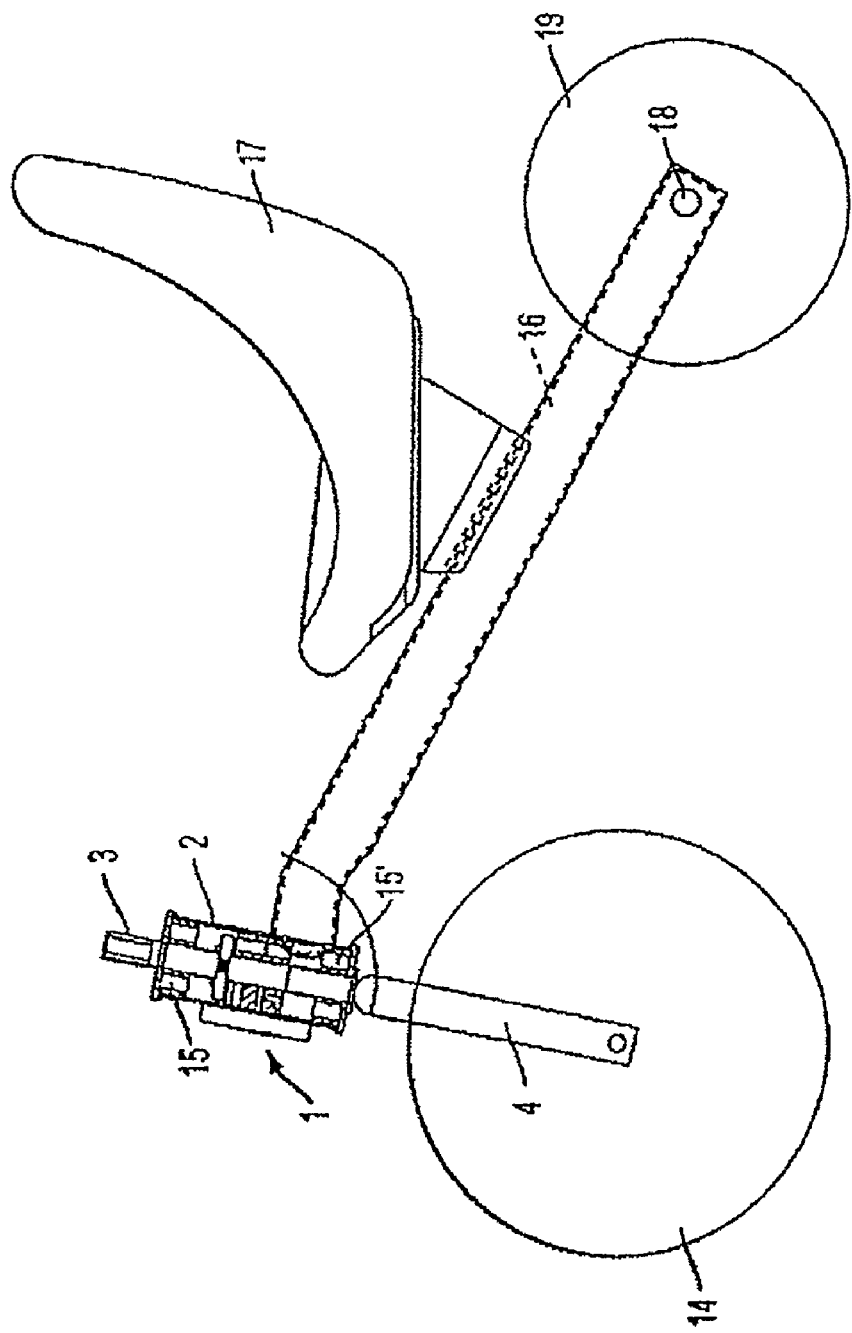
FIG. 1 is a schematic side view of a children's tricycle with one embodiment of the vehicle steering head according to the invention.

A children's tricycle is shown in FIG. 1 and comprises a front wheel 14 which is supported on a wheel fork 4. Wheel fork 4 is fixedly connected to a fork member 3. A handlebar (not shown) can be secured to the upper end of fork member 3.

Fork member 3 is supported in a support tube 2. This support is accomplished by utilizing slide bearings 15 and 15' which are shown in detail in FIGS. 2 to 5. The slide bearings 15 and 15' correspond to those of the prior art in this embodiment so that a detailed description is not needed.

Support tube 2 is firmly connected to a frame 16 which has mounted thereon a seat 17. The tricycle also has a rear axle 18 with rear wheels 19. Accordingly, a support tube 2 and a fork member 3 form a steering head 1.

Figure 6:
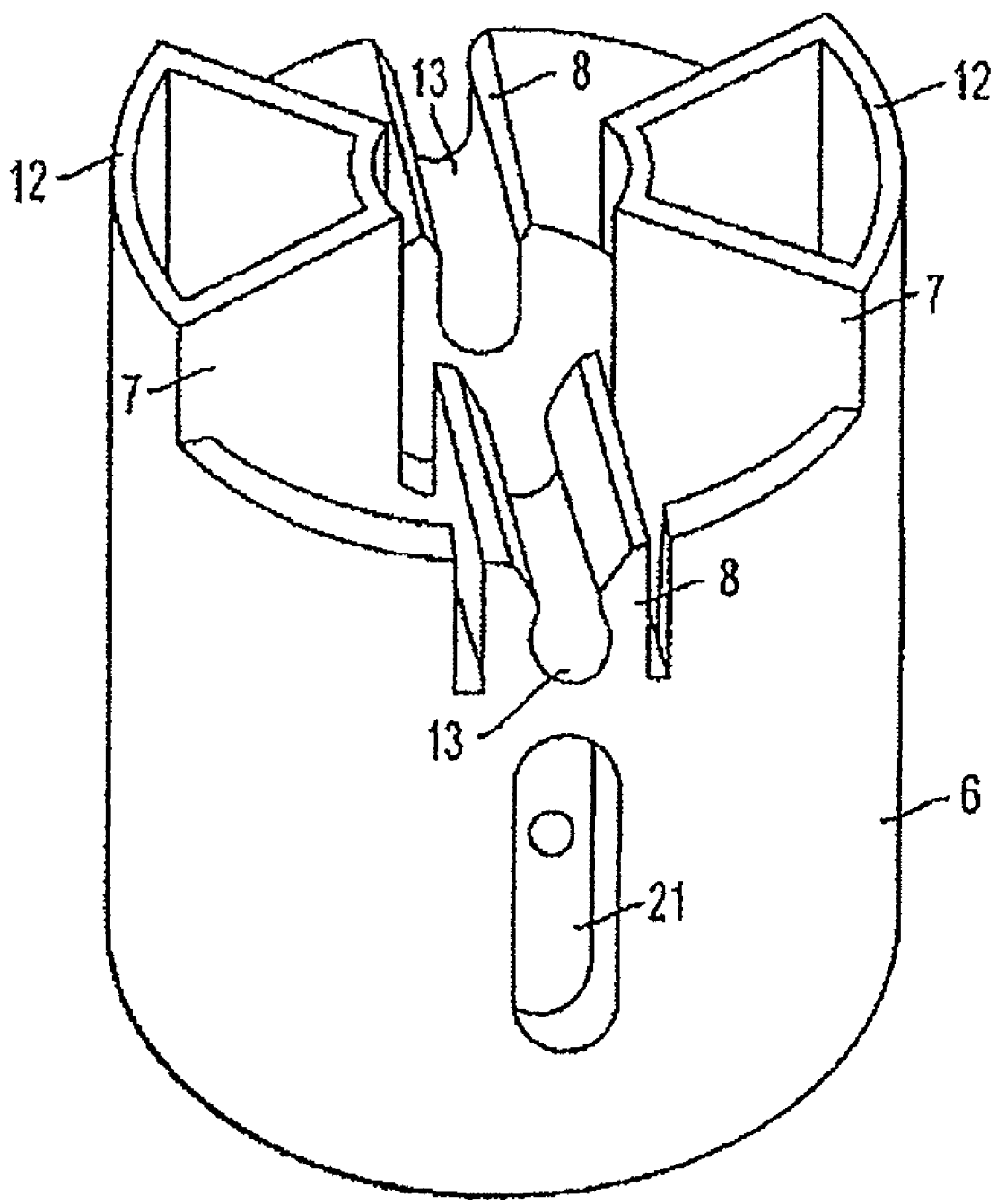
FIG. 6 is a simplified perspective illustration of the linkage element according to the invention.

According to the invention, support tube 2 has arranged therein a linkage element 6 which has a substantially cylindrical configuration (see also FIG. 6) and which is received with a play or clearance (so that it can slide) within support tube 2. Linkage element 6 is also provided with a central recess through which fork member 3 extends or passes.

Support tube 2 also has formed therein a longitudinal slot 9 through which a connection element 10 extends or passes. This connection element 10 is connected to a slide 11 and linkage element 6. The connection may be via a screw 20 (see FIGS. 2 and 4) or other conventional connecting mechanism. In the illustrated embodiment, connection element 10 is integrally connected to or formed with slide 11 and extends in a recess 21 of linkage element 6. However, connection element 10 and slide 11 may be made as separate components which are joined or secured together by any conventional attachment technique including a screw or threaded element.

On its front upper portion, linkage element 6 comprises two symmetrical opposite attachments or stops 12. Each of these stops 12 may be provided with lateral stop surfaces 7. When viewed from the top, these attachments or stops 12 are designed in a manner of a segment of a partial circle (pie shaped or wedge shaped), so that four stop surfaces 7 are formed, with each one being arranged in symmetry with one another. Of course, stops 12 may be separately formed and attached to linkage element 6 instead of being integrally formed therewith, as is shown.

In the illustrated embodiment two locking elements 8 may be utilized in which each is formed by a recess 13. These locking elements 8 are preferably provided on linkage element 6 in retracted or set back manner with respect to stops 12. As is apparent from FIG. 6, the walls of at least one recess 13 may be made resilient to ensure a releasable locking of a bolt-like latch element 5 when linkage element 6 is pushed upwards or into engagement with bolt-like latch element 5.

As is apparent from FIGS. 2 to 5, fork member 3 is provided with a bolt-like or pin-like latch element 5 which extends or projects from at least one and preferably both sides of fork member 3. Of course, latch element 5 may be integrally formed with fork member. Alternatively, latch element 5 may be a threaded or partially threaded member which threads into fork member 3. However, it is preferred that latch element 5 be a pin having a centrally disposed exterior knurl which is press fit into a fork member as is shown. In its working position, latch element 5 rotates with fork member 3 when a deflection or rotation of the handlebar takes place. The deflection of the handlebar is limited by way of latch element 5 abutting on stop surfaces 7, these stop surfaces 7 defining the limited range of motion of the handlebar.

When it is desired to lock the handlebar in a set position, latch element 5 is pressed or forced into recesses 13. This engagement occurs when locking element 8, which is disposed on linkage element 6, is pushed upwards by slide 11. Recesses 13 also utilize inclined inlet surfaces because they act as guiding lead-in surfaces which facilitate entry of pin 5 into recess 13. In the locked state, which is shown in FIGS. 4 and 5, a steering movement thus becomes impossible since the handlebar or fork member 3 is locked in a single direction. FIGS. 2 and 3 show a downwardly displaced condition of linkage element 6 in which latch element 5 is in a position which it does not cooperate with the locking element 8. As a result, in this position fork member 3 and handlebar are free to rotate until latch element 5 abuts on stop surfaces 7, this range of movement or rotation corresponding to a steering angle range.

According to a preferred aspect of the invention, linkage element 6 may be made from a plastic material. Of course, other materials are also contemplated.

Another embodiment of the vehicle steering head according to the invention is described with reference to FIGS. 7 to 16. In this regard, like parts are provided with like reference numerals.

Figure 7:
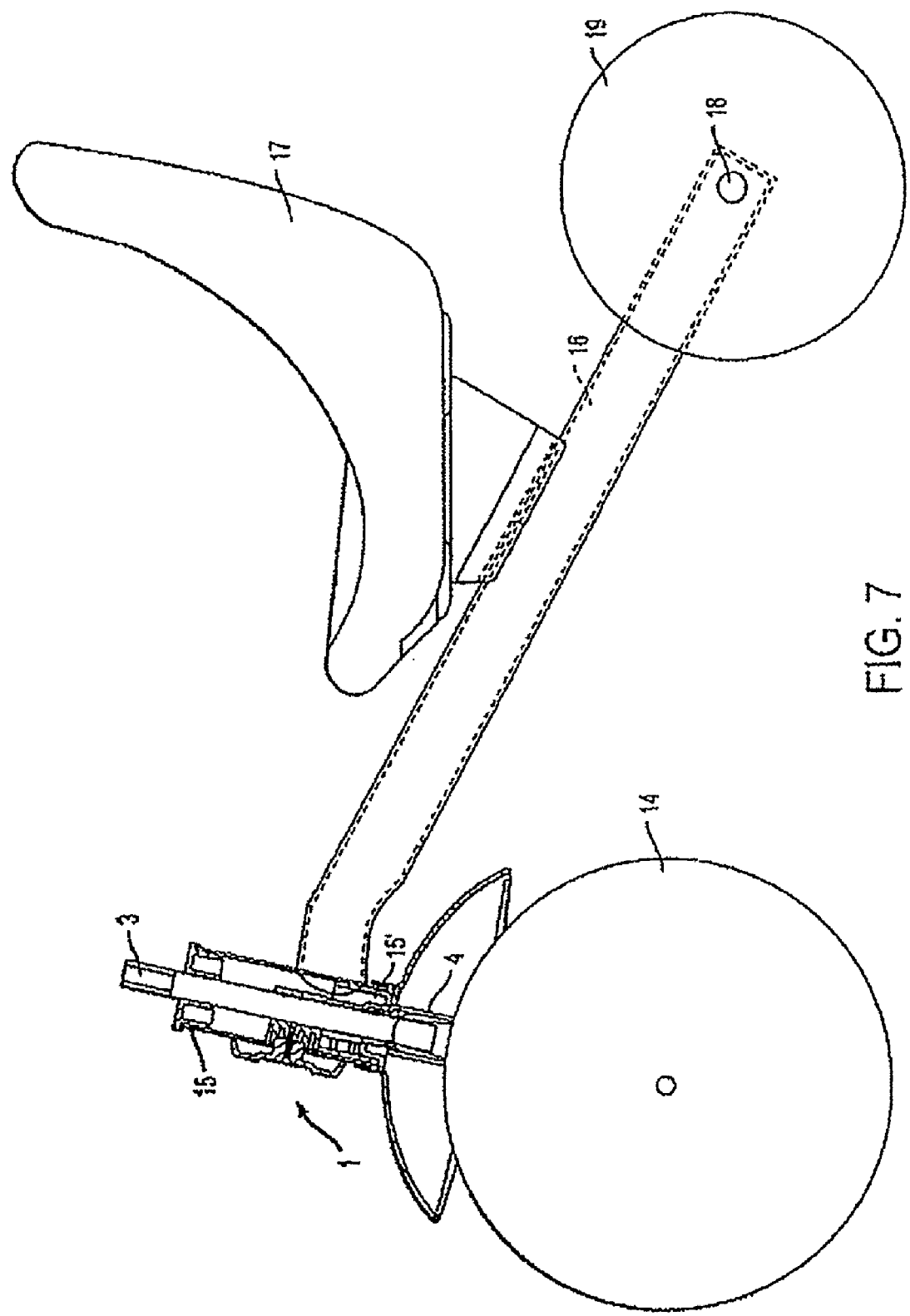
FIG. 7 is a schematic side view of a children's tricycle with another embodiment of the vehicle steering head according to the invention.
Figure 8:
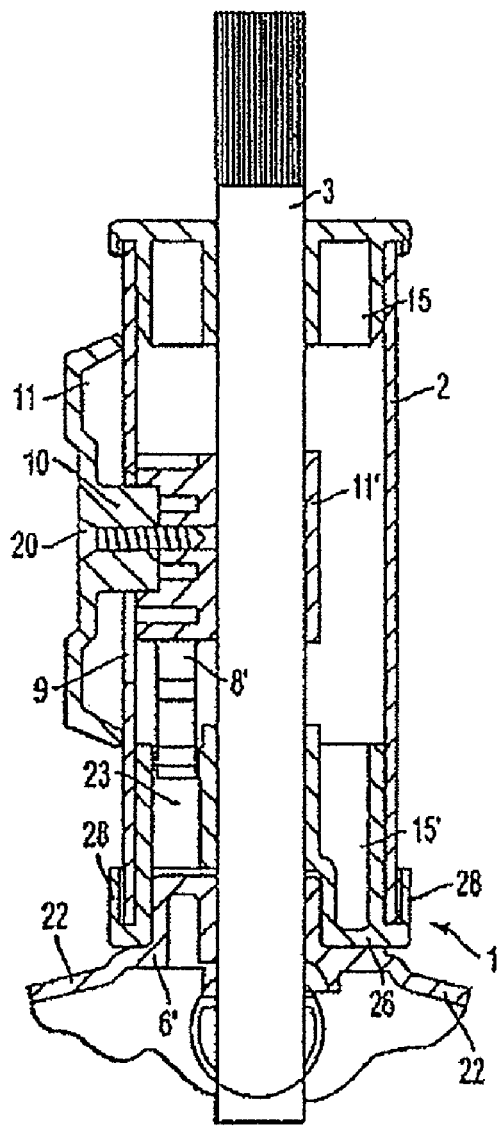
FIG. 8 is a sectional side view of the vehicle steering head according to the invention, in the unlocked state.
Figure 9:
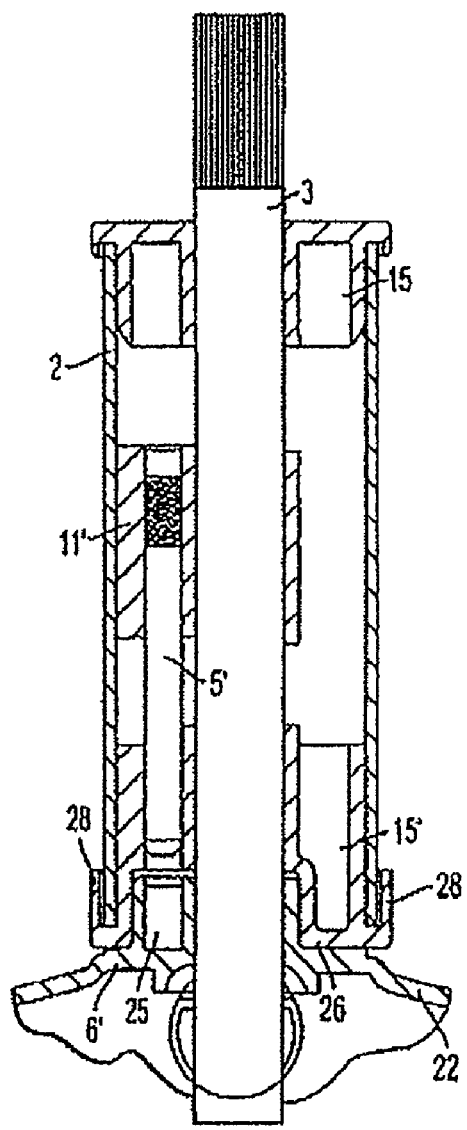
FIG. 9 is a side view, turned or oriented by 90° of the arrangement shown in FIG. 8.
Figure 10:
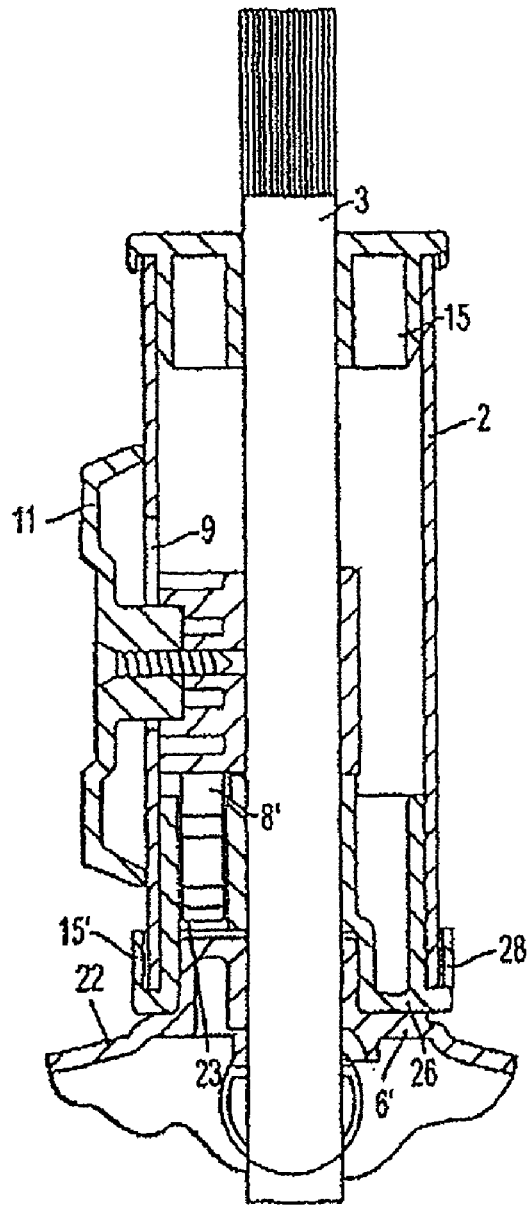
FIG. 10 is a sectional side view similar to FIG. 8, in the locked state.
Figure 11:
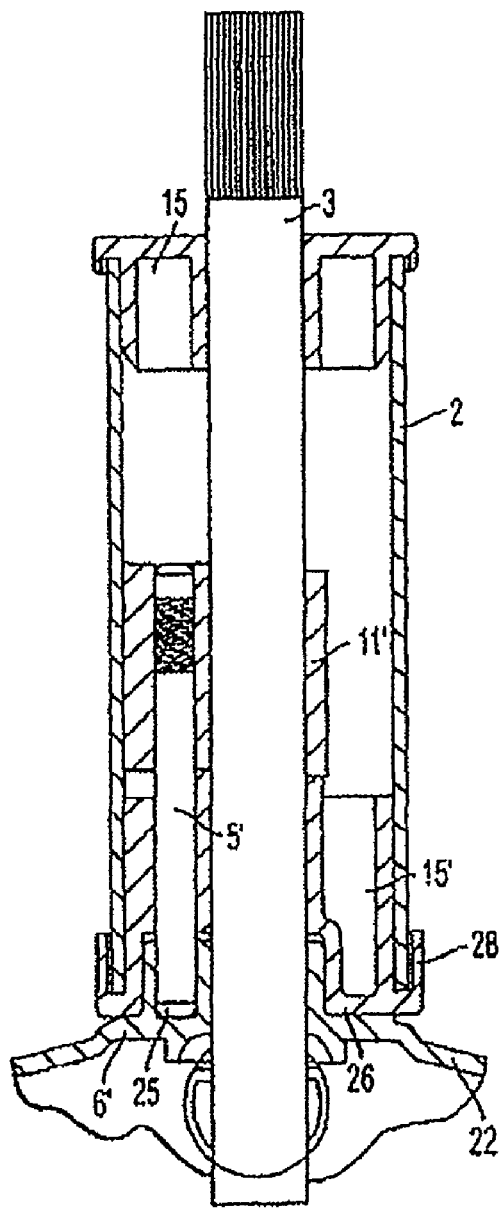
FIG. 11 is a side view, turned or oriented by 90° which is similar to FIG. 9, in the locked state.

As for the description of FIG. 7, reference can be made to the description of FIG. 1 to the extent that the same features are shown. The subsequent figures are illustrations elucidating the details which have been changed.

As in FIGS. 2 to 5, FIGS. 8 and 9 and 10 and 11, respectively, are illustrations showing the vehicle steering head on an enlarged scale. Again, like parts are here also provided with like reference numerals, so that reference can be made to the preceding explanations. Slide 11 utilizes connection element 10 and screw 20. Connection element 10 also extends through a longitudinal slot 9. Moreover, slide 11 comprises an outer grip portion 11 and an interior portion 11' which is screwed to outer grip portion 11 by a screw 20. A top view of slide 11 and 11' is shown in FIG. 16. As can be seen in this figure, a central recess 24 is provided through which fork member 3 extends or passes (with a clearance which allows slide 11' to move up and down with respect to fork member 3). Furthermore, slide 11' also has a recess (see FIGS. 9, 11 and 16) which is formed so that it can accept a bolt-like latch element 5'. Of course, this latch element 5' may be pressed into this recess, threaded into the recess, or otherwise secured to slide 11' in a suitable manner. Alternatively, latch element 5' may be integrally formed with slide 11'.

As already described in conjunction with a previous embodiment, a bearing 15 which serves as a slide bearing is used on the upper portion of steering head 1.

Lower bearing 15' in this embodiment is configured such that it has an upwardly projecting contour of a linkage element 6' which can extend into bearing 15'. Of course, the bearing and the upwardly projecting contour may be made as separate components which are joined together by conventional techniques rather than integrally formed as is shown. Additionally, as becomes apparent in FIG. 12, linkage element 6' may have a recess 25 into which latch element 5' can be inserted (see also FIGS. 9 and 11).

Figure 12:
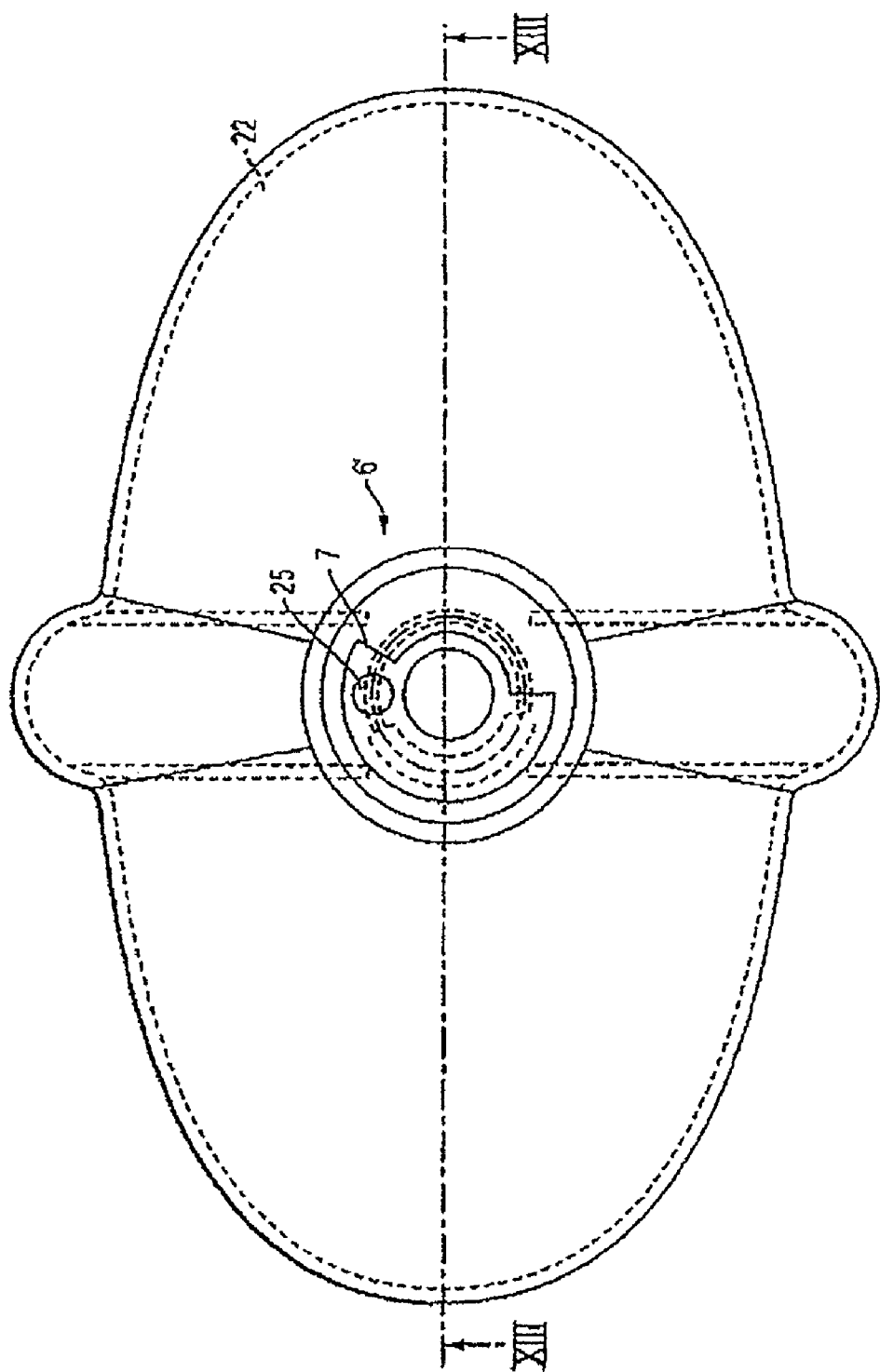
FIG. 12 is a top view on the linkage element according to the invention and on the associated mudguard.

As can further be seen from the top view of FIG. 12, linkage element 6' comprises two lateral stop surfaces 7 which are angularly spaced apart from each other. This design is such that a downwardly oriented attachment or stop 26 (see FIGS. 8 to 11) of the bearing 15', which is connected to support tube 2, forms a steering limitation of plus/minus approximately 45°. Of course, as with the previous embodiment, the range of steering limitation can be designed to any desired range.

FIG. 13 shows a lateral sectional view of mudguard 22 and of linkage element 6'. Note that these components are integrally formed as a single member which reduces manufacturing costs associated with joining two separate components.

FIGS. 14 and 15 are front views of slide 11' wherein handpiece 11 has been removed to illustrate the operation of locking element 8'. Locking element 8' is U-shaped and includes two movable or flexible lateral legs which can releasably be inserted into a recess 23 of bearing 15'. Upon insertion and locking, locking element 8' is pressed against an undercut and thereby held in position inside recess 23. Accordingly, when it is desired to release the locked state of fork member 3, slide 11' must be pushed upwards which removes the legs from recess 23. Of course, other locking mechanisms may be utilized and this embodiment is not limited to the use of this particular locking mechanism. For example, a pin may be used which has a floating ring disposed around its circumference. Alternatively, other conventional releasable locking mechanisms may be utilized.

FIG. 17 is a top view on lower bearing 15' on an enlarged scale. The (downwardly projecting) attachment or stop 26 can be seen here as can recess 23 which receives locking element 8'. Moreover, recess 27 is adapted to receive and guide bolt-like latch element 5' therein. Furthermore, a surrounding collar-like edge 28 can be seen in which 29 designates two oppositely disposed attachments or projections which serve as anti-rotation engagements. These engagements are designed to engage recesses (not shown) of support tube 2. Of course, lower bearing may be secured to support tube 2 in any conventional manner such as by bonding, welding, or screws. Moreover, this attachment may be releasable or more permanent in nature.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A system for limiting a range of motion of a handlebar, comprising:
    a support tube adapted to be fixed to a frame;
    a member adapted to connect a wheel fork to the handlebar;
    an upper bearing support mounted to an upper end of the support tube;
    a lower bearing support mounted to a lower end of the support tube;
    the member being rotatably mounted to the support tube via the upper and lower bearing supports;
    a movement limiting system limiting a range of rotational movement of the member and utilizing stop surfaces arranged on the lower bearing support.

2. The system of claim 1, further comprising a mudguard rotating with the member.

3. The system of claim 1, wherein the member is cylindrically shaped.

4. The system of claim 1, wherein the system is arranged on a children's tricycle, the handlebar is connected to one end of the member, and a wheel fork is connected to another end of the member.

5. The system of claim 4, further comprising a mudguard arranged between the wheel fork and the lower bearing support.

6. A steering head for a tricycle, comprising:
    a hollow support tube fixed to a frame;
    a member adapted to connect a wheel fork to a handlebar;
    the member being rotatably mounted to the hollow support tube via upper and lower bearing supports and having a limited range of rotational motion in each of two directions; and
    the lower bearing support comprising stop surfaces adapted to provide the limited range of rotational motion.

7. The steering head of claim 6, wherein the stop surfaces are disposed within the hollow support tube.

8. The steering head of claim 7, wherein the lower bearing support is non-rotatably mounted to a lower end of the hollow support tube.

9. The steering head of claim 6, wherein the member is cylindrically shaped.

10. The steering head of claim 6, further comprising a handlebar connected to one end of the member and a wheel fork connected to another end of the member.

11. A tricycle steering head having a limited steering, comprising:
    a hollow support tube;
    a member connecting a wheel fork to a handlebar;
    the member being rotatably mounted to the hollow support tube via upper and lower bearing supports; and
    a projection oriented vertically and extending into an arc-shaped recess;
    wherein the limited steering utilizes contact with one stop surface to limit rotational movement of the member in one direction and contact with another stop surface to limit rotational movement of the member in another direction, and
    wherein said stop surfaces are arranged on the lower bearing support.

12. The steering head of claim 11, wherein the member is cylindrically shaped.

13. A steering head for a tricycle, comprising:
    a hollow support tube fixed to a frame;
    a member adapted to connect a wheel fork to a handlebar;
    the member being rotatably mounted to the hollow support tube via upper and lower bearing supports;
    the lower bearing support comprising a recess with first and second stop surfaces;
    a mechanism that rotates with the member; and
    the mechanism being arranged between the wheel fork and the lower bearing support and having a portion which extends up into the recess,
    wherein the mechanism has a first stop surface which contacts the first stop surface of the lower bearing support so as to limit a range of rotational motion of the member in one direction and a second stop surface which contacts the second stop surface of the lower bearing support so as to limit a range of rotational motion of the member in another direction.

14. The steering head of claim 13, wherein the portion which extends up into the recess and the recess are arcuate shaped.

15. A method of limiting a range of steering motion for a vehicle comprising a support tube fixed to a frame, a member adapted to connect a wheel fork to a handlebar, an upper bearing support mounted to an upper end of the support tube, and a lower bearing support mounted to a lower end of the support tube, the method comprising;
    mounting the member to the support tube via the upper and lower bearing supports; and limiting a range of rotational movement of the member in each of two directions utilizing stop surfaces arranged on the lower bearing support,
wherein a portion of the stop surfaces extends into a lower end of the support tube.

16. The method of claim 15, further comprising allowing a mudguard to rotate with the member.

17. The method of claim 15, wherein the member is cylindrically shaped.

18. The method of claim 15, wherein the limiting utilizes a projection which contacts each of the stop surfaces.

19. The method of claim 15, wherein the vehicle comprises a children's tricycle.

20. The method of claim 15, wherein the lower bearing support comprises a one-piece lower bearing support.

21. A steering head for a tricycle, comprising:
a hollow support tube fixed to a frame;
a member adapted to connect a wheel fork to a handlebar;
the member being rotatably mounted to the hollow support tube via upper and lower bearing supports;
the lower bearing support comprising first and second stop surfaces; and
a mechanism having a first stop surface which contacts the first stop surface of the lower bearing support so as to limit a range of rotational motion of the member in one direction and a second stop surface which contacts the second stop surface of the lower bearing support so as to limit a range of rotational motion of the member in another direction.

22. The steering head of claim 21, wherein the mechanism is arranged on a mudguard.

23. The steering head of claim 22, wherein the mechanism and the mudguard comprise a one-piece member.

24. A method of using the vehicle steering head of claim 21, the method comprising;
mounting the member to the support tube via the upper and lower bearing supports; and
limiting a range of rotational movement of the member in each of two directions utilizing the first and second stop surfaces of the lower bearing support.

25. The method of claim 24, further comprising rotating a mudguard with the member.

26. A steering head for a tricycle, comprising:
a hollow support tube fixed to a frame;
a member adapted to connect a wheel fork to a handlebar;
the member being rotatably mounted to the hollow support tube via upper and lower bearing supports;
the lower bearing support comprising first and second stop surfaces and a recess;
a mudguard;
a mechanism arranged on the mudguard and having a portion that projects into the recess of the lower bearing support; and
the mechanism having a first stop surface which is adapted to contact the first stop surface of the lower bearing support so as to limit a range of rotational motion of the member in one direction and a second stop surface which is adapted to contact the second stop surface of the lower bearing support so as to limit a range of rotational motion of the member in another direction.

27. The steering head of claim 26, wherein the mechanism and the mudguard comprise a one-piece member.

28. A method of using the vehicle steering head of claim 26, the method comprising;
mounting the member to the support tube via the upper and lower bearing supports; and
limiting a range of rotational movement of the member in each of two directions utilizing the first and second stop surfaces of the lower bearing support.

29. The method of claim 28, further comprising rotating the mudguard with the member.

30. A vehicle steering head for a tricycle having a frame, the vehicle steering head comprising:
a support tube fixed to the frame;
an upper bearing support mounted to the support tube;
a lower bearing support mounted to the support tube;
a connecting element having one end connected to a wheel fork and another end adapted to be connected to a handlebar;
the connecting element being rotatably mounted to the support tube via the upper and lower bearing supports;
a movement limiting system that limits rotational movement of the connecting element;
the movement limiting system comprising a recess and a projecting portion which moves within the recess;
the recess having two stop surfaces and being arranged on the lower bearing support;
one of the two stop surfaces limiting the rotation of the connecting element in one direction when the projecting portion engages one of the two stop surfaces;
another of the two stop surfaces limiting the rotation of the connecting element in another direction when the projecting portion engages another of the two stop surfaces; and
the projecting portion being arranged on a mudguard and projecting up into the recess,
wherein the mudguard rotates with the connecting element about an axis that runs through the connecting element.

31. A vehicle steering head for a tricycle having a frame, the vehicle steering head comprising:
a support tube fixed to the frame;
an upper bearing support mounted to the support tube;
a lower bearing support mounted to the support tube;
a connecting element having one end connected to a wheel fork and another end adapted to be connected to a handlebar;
the connecting element being rotatably mounted to the support tube via the upper and lower bearing supports;
a movement limiting system that limits rotational movement of the connecting element;
the movement limiting system utilizing stop surfaces and comprising a recess and a projecting portion which moves within the recess;
the recess being arranged on the lower bearing support;
the projecting portion being movable with the connecting element; and
a mudguard,
wherein the projecting portion rotates with the connecting element about an axis that runs through the connecting element.

32. The steering head of claim 31, wherein the projecting portion and the mudguard are a one-piece member.

33. A steering head for a tricycle, comprising:
a hollow support tube fixed to a frame;
a member adapted to connect a wheel fork to a handlebar;
the member being rotatably mounted to the hollow support tube via upper and lower bearing supports;
the lower bearing support comprising a recess;
a mudguard; and
a mechanism that rotates with the mudguard and having a portion that projects into the recess of the lower bearing support, wherein the member has a limited range of rotational motion in each of a first and second directions.

34. The steering head of claim 33, wherein the mechanism comprises an upward oriented projection arranged between the mudguard and the lower bearing support.

35. The steering head of claim 33, wherein the mechanism and the mudguard comprise a one-piece member.

36. The steering head of claim 33, wherein the recess is arcuate shaped.

37. The steering head of claim 33, further comprising a steering lock system.

38. A vehicle steering head for a tricycle, comprising:
a support tube adapted to be fixed to a frame;
a connecting member adapted to connect a wheel fork to a handlebar;
an upper bearing support mounted to an upper end of the support tube;
a lower bearing support mounted to a lower end of the support tube and comprising a recess;
the connecting member being rotatably mounted to the support tube via the upper and lower bearing supports;
a mudguard; and
a projection which rotates with the connecting member, is oriented upwardly, and has an upper end that extends into the recess of the lower bearing support,
wherein the vehicle steering head limits rotational movement of the connecting member in each of two directions.

39. A vehicle steering head for a tricycle, comprising:
a support tube adapted to be fixed to a frame;
a wheel fork;
a handlebar;
a connecting member;
an upper bearing support mounted to an upper end of the support tube;
a lower bearing support mounted to a lower end of the support tube and comprising an arcuate recess;
the connecting member being mounted to the support tube via the upper and lower bearing supports; and
a projection having an upper end that extends into the arcuate recess of the lower bearing support,
wherein the projection and arcuate recess function to limit rotational movement of the handlebar in each of two directions.

40. The steering head of claim 39, wherein the connecting member defines a rotation axis for the wheel fork and the projection rotates about the rotation axis.

41. A tricycle steering system, comprising:
a support tube connected to a frame of a tricycle;
an upper bearing support mounted to an upper end of the support tube;
a lower bearing support mounted to a lower end of the support tube;
a front wheel;
a connecting member mounted to the support tube via the upper and lower bearing supports; and
a movement limiting system limiting rotational movement of the front wheel and the connecting member in each of two directions via contact between surfaces,
wherein a portion of the movement limiting system has an opening which receives therein a portion of the connecting member and is axially disposed between an upper end of the lower bearing support and the front wheel.

42. The tricycle steering system of claim 41, further comprising a mudguard.

43. The tricycle steering system of claim 42, wherein the mudguard is a one-piece member and comprises an annular surface which contacts an annular surface of the lower bearing support.

44. The tricycle steering system of claim 43, wherein the portion of the movement limiting system rotates with the connecting member and has an upper surface that is axially arranged within the support tube.

45. The tricycle steering system of claim 44, wherein the portion of the movement limiting system is axially arranged between the annular surface of the mudguard and a portion of a locking mechanism.

46. The tricycle steering system of claim 41, wherein the portion of the movement limiting system comprises an opening at least one of:
that is a circular through opening;
adapted to receive therein a pin; and
having a center axis parallel to an axis of the connecting member.

47. The tricycle steering system of claim 41, further comprising a wheel fork,
wherein the portion of the movement limiting system is axially arranged between the upper bearing support and the wheel fork,
wherein the upper bearing support has a portion that extends into the support tube and a portion that is arranged outside the support tube,
wherein the lower bearing support has a portion that extends into the support tube and a portion that is arranged outside the support tube, and
wherein the lower bearing support is non-rotatably mounted to the lower end of the support tube.

48. The tricycle steering system of claim 41, further comprising a projection, wherein the lower bearing support comprises a recess adapted to at least one of engage and receive the projection.

49. The tricycle steering system of claim 41, further comprising a locking mechanism at least one of:
being movable from an unlocked position to a locked position;
having one portion that contacts the connecting member and another portion that can be gripped by a user; and
having one portion that is axially arranged between upper and lower ends of the connecting member and another portion that can be gripped by a user.

50. The tricycle steering system of claim 41, wherein the contact between surfaces occurs at least partially within the support tube.

51. A method of limiting a range of steering motion for a front wheel of a tricycle using the tricycle steering system of claim 41, the method comprising:
limiting a range of rotational movement of the front wheel in each of two directions.

52. A tricycle steering system, comprising:
a support tube connected to a tricycle frame;
an upper bearing support mounted to an upper end of the support tube;
a lower bearing support mounted to a lower end of the support tube;
a front wheel;
a connecting member mounted to the support tube via the upper and lower bearing supports;
a movement limiting system limiting rotational movement of the front wheel in each of two directions and including:

an arc-shaped recess formed in the lower bearing support and comprising a surface axially arranged within the support tube;

a projection that moves with the connecting member about a center axis of the connecting member, extends up into the arc-shaped recess; and a member comprising the projection and having a portion extending outside the support tube, wherein:

when the connecting member is rotated in one direction, a first stop surface of the projection moves toward a first stop surface of the arc-shaped recess; and when the connecting member is rotated in another direction, a second stop surface of the projection moves toward a second stop surface of the arc-shaped recess.

53. The tricycle steering system of claim 52, further comprising:

the connecting member having an upper end adapted to connect to a handle bar and a lower end;

a wheel fork connected to the front wheel and to the lower end of the connecting member; and a mudguard having an annular surface axially disposed between the lower bearing support and the wheel fork.

54. The tricycle steering system of claim 52, wherein:

the member is movable about the center axis of the connecting member and is axially disposed between a wheel fork and the lower bearing support;

the surface and the upper surface are arranged axially adjacent one another; and each of the upper and lower bearing supports are separately formed and comprise a portion extending outside the support tube and a portion extending within the support tube.

* * * * *

UNITED STATES PATENT AND TRADEMARK OFFICE
CERTIFICATE OF CORRECTION

PATENT NO. : 8,201,840 B2
APPLICATION NO. : 12/349009
DATED : June 19, 2012
INVENTOR(S) : H. Kettler et al.

It is certified that error appears in the above-identified patent and that said Letters Patent is hereby corrected as shown below:

On the Title Page; Foreign Application Priority Data, please change "299 11 652 U" to -- 299 11 652.2 --.

On Title Page 1; Other Publications, please change "Document entitled . . . lawsuit initialed" to -- Document entitled ... lawsuit initiated --.

On Title Page 3; Other Publications, please change "Document produced . . . FSH-PS. And . . .(OFRAT2000741-OFRAT2000748)." to -- Document produced . . . FSH-PS and . . .(OFRAT2000741-OFRAT2000748). --

On Title Page 4; Other Publications, please change "Document produced . . . a fedEx label (OFRAT2000804)." to -- Document produced . . . a FedEx label (OFRAT2000804). --.

On Title Page 4; Other Publications, please change "Document produced . . . appearing to an . . . ITAL000320." to -- Document produced . . . appearing to show an . . . ITAL000320. --.

At column 12, line 65 (claim 15, line 6), please change "method comprising;" to -- method comprising: --.

At column 13, line 36 (claim 24, line 2), please change "method comprising;" to -- method comprising: --.

At column 13, line 65 (claim 28, line 2), please change "method comprising;" to -- method comprising: --.

Signed and Sealed this
Fifth Day of February, 2013

Teresa Stanek Rea
*Acting Director of the United States Patent and Trademark Office*

CERTIFICATE OF CORRECTION (continued)
U.S. Pat. No. 8,201,840 B2

At column 16, line 53 (claim 51, line 3), please change "method comprising;" to -- method comprising: --.

At column 18, line 2 (claim 53, line 4), please change "handle bar" to -- handlebar --.